Dec. 12, 1939.    G. J. BYRNE    2,183,184
COMBUSTION CONTROL SYSTEM
Filed Oct. 5, 1936    2 Sheets-Sheet 1
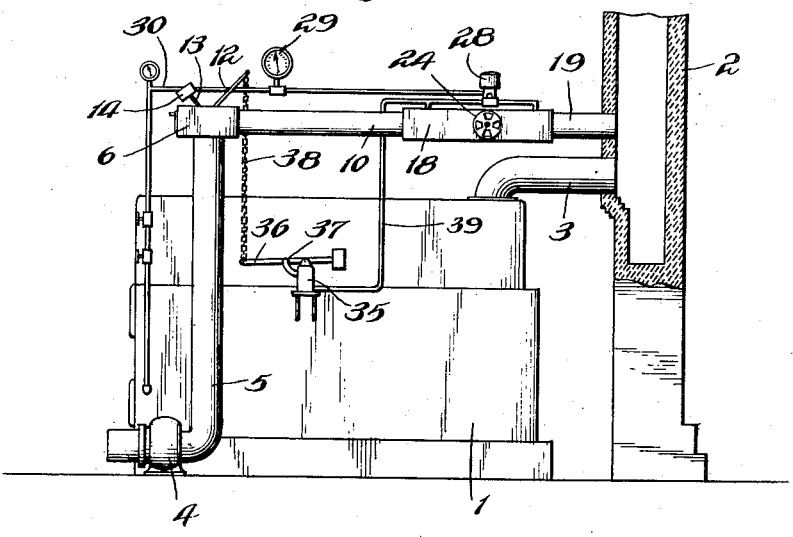
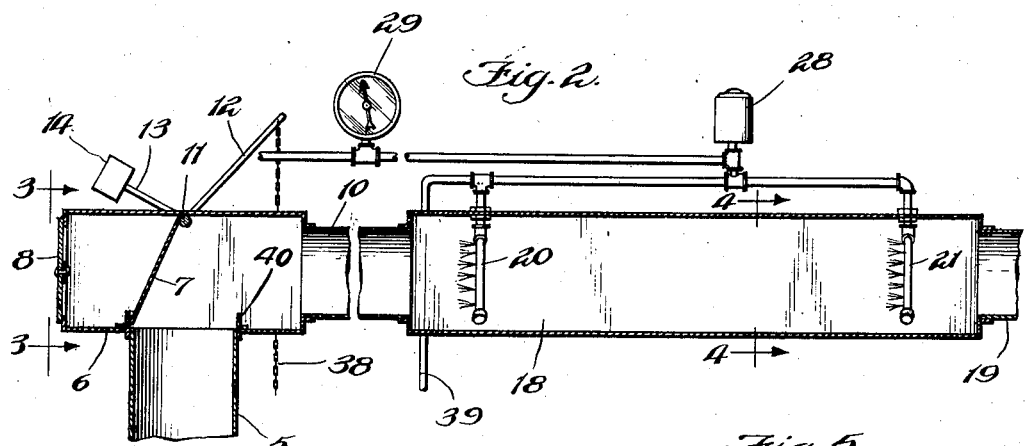
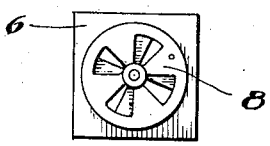
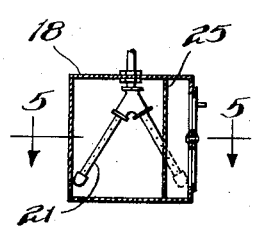
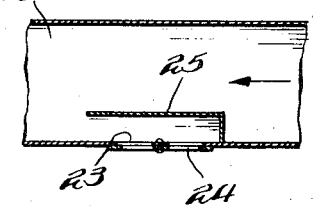
INVENTOR.
George J. Byrne
BY Morris Spector
ATTORNEY.

Dec. 12, 1939.                    G. J. BYRNE                      2,183,184
                          COMBUSTION CONTROL SYSTEM
                            Filed Oct. 5, 1936            2 Sheets-Sheet 2

INVENTOR
George J. Byrne
BY
ATTORNEY

Patented Dec. 12, 1939

2,183,184

UNITED STATES PATENT OFFICE 2,183,184

COMBUSTION CONTROL SYSTEM

George Joseph Byrne, Chicago, Ill.

Application October 5, 1936, Serial No. 104,085

5 Claims. (Cl. 110—49)

This invention relates to means for supplying air for the combustion of fuel in a furnace, particularly coal.

It is an object of the present invention to provide an air supply arrangement whereby the amount of excess air that might be supplied over that necessary for effective combustion of the fuel is reduced to a minimum and wherein the heat of the flue gases is utilized to pre-heat or increase the temperature of the air supplied for combustion of the coal, thereby increasing the efficiency of combustion.

It has heretofore been proposed to provide air supply means for furnaces with arrangements for withdrawing flue gases from the stack or the like, mixing them with air, and then introducing such mixture into the furnace. I have found that with such an arrangement the increase in efficiency is quite small. When dealing with cheaper grades of coal, especially such grades as produce a good deal of smoke or soot, the amount of available heat which is lost up the chimney is considerable. I propose an arrangement whereby the major portion of such heat is saved. When a major portion of the flue gases are extracted from the flue and recirculated through the furnace there is but a slight increase in overall heat efficiency because, I have found, the recirculation does not result in complete utilization of the available energy.

I have discovered that if steam is injected into or intimately mixed or commingled with the moving flue gases the physical or other changes which result from such injection and mixing are such that the heat energy available in such a mixture appears to be more readily extractable. It is therefore, one of the objects of the present invention to provide for the injection of steam into the flue products of a furnace and to mix therewith a quantity of fresh air, thereafter circulating the resultant product to and through the furnace.

It is a still further object of the present invention to provide a mechanical layout whereby the air supply means may readily be changed, to bypass the flue gas circulating system, as may be necessary when the furnace is being started.

The attainment of the above and further objects of the present invention will be apparent from the following specification taken in conjunction with the accompanying drawings forming a part thereof.

In the drawings:

Figure 1 is a diagrammatic view, in partial section, illustrating one embodiment of the present invention;

Figure 2 is an enlarged longitudinal sectional view through a portion of the flue gas ducts etc. of the system of Figure 1;

Figure 3 is an enlarged end view from the position of the line 3—3 of Figure 2;

Figure 4 is a fragmentary view taken along the line 4—4 of Figure 2;

Figure 5 is a fragmentary sectional view taken along the line 5—5 of Figure 4.

Figure 6:
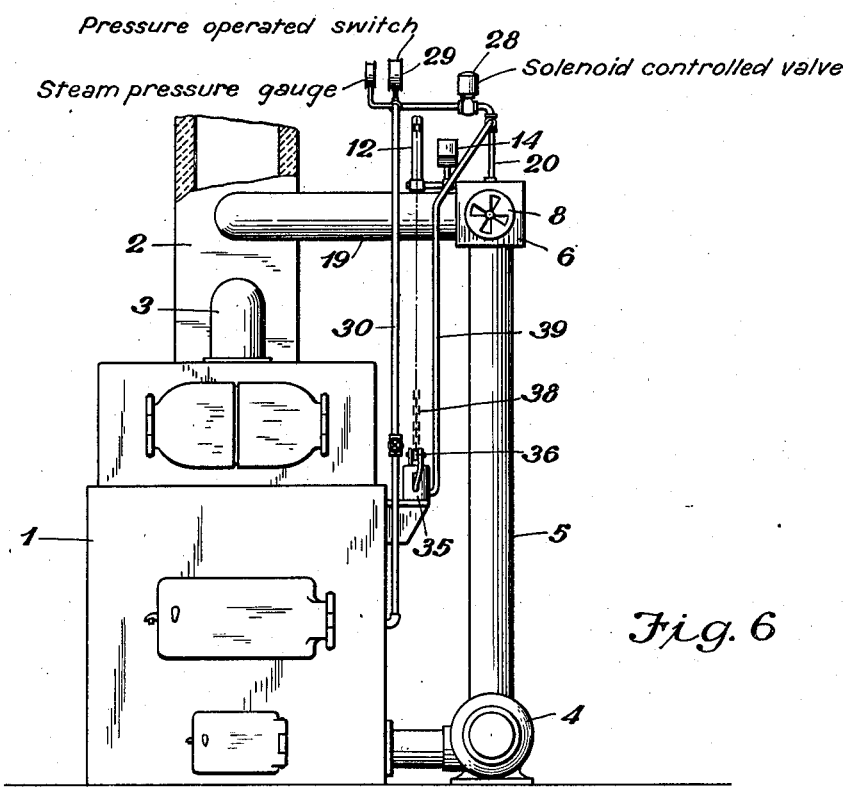
Figure 6 is a front elevation of the furnace and the apparatus shown in Fig. 1.
Figure 7:
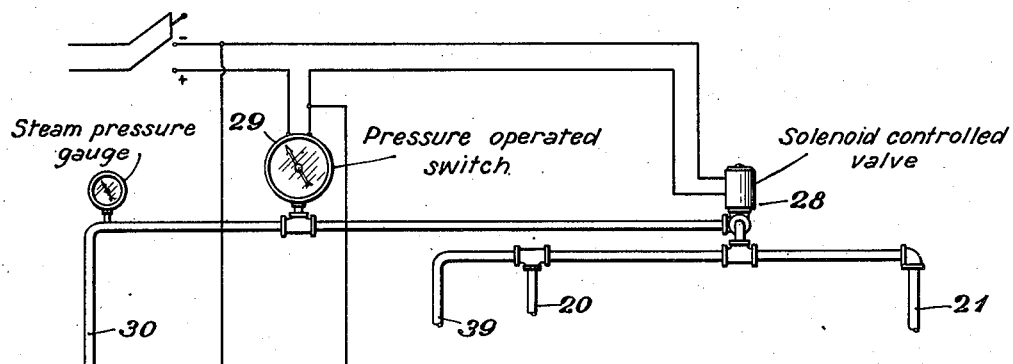
Figure 7 is a diagrammatic view showing the electrical control used in operating the system in the preferred manner.

Reference may now be had more particularly to Figure 1. In this figure I have shown, at 1, a conventional coal burning furnace for generating steam, as for domestic heating purposes. The furnace is provided with the usual boiler for generating steam. At 2 is indicated a stack through which the products of combustion are discharged into the atmosphere, the furnace having a flue outlet 3 discharging into the stack 2. An electric motor driven fan 4 is provided for supplying air to the furnace for combustion of the coal. The outlet side of the fan is connected to the furnace to deliver air thereto below the grate. The inlet side of the fan is connected to a conduit 5 which leads to a damper compartment 6 having a damper 7 therein. At its left hand side the damper compartment opens to the atmosphere, the extent of opening being controlled by a ported disc 8 which may be turned to uncover greater or lesser areas of the opening at the left hand end of the damper compartment 6. At its right hand end the damper compartment has connected thereto a duct 10. The damper 7 connects the conduit 5 selectively to the duct 10 or to the atmospheric opening 8, depending upon the position of the damper. The damper is pivoted about a pivot 11 and controlled automatically through a handle 12 or manually through a handle 13. The handle 13 is weighted, as indicated at 14, so that the damper 7 normally tends to assume a position opposite to that illustrated in Figure 2, to which it is moved by automatic means to be presently described.

The duct 10 is connected to a steam mixing chamber 18 which in turn is connected by means of a pipe 19 to the stack 2, the pipe 19 opening in the stack and terminating flush with the inner wall of the stack 2. The steam mixing chamber has two similar sets of steam inlet pipes 20 and 21 each of which is provided with a number of small holes for discharging steam into the chamber 18. There is also provided an air inlet opening 23 controlled by a manually rotatable ported disc 24 which may be turned to any desired position to control the extent of air movement through the opening 23, the construction of the disc 24 being identical with the disc 8. A baffle 25 is fixed in the steam mixing chamber 18 adjacent to the air inlet opening 23 to prevent escape of the products of the flue through the opening 23.

An electromagnetically controlled (solenoid) valve 28 controls the flow of steam to the steam inlet pipes 20 and 21, the valve being controlled by a pressure operated electric switch 29. The switch 29 is arranged to close its circuit when the pressure drops below two pounds, and maintain the circuit closed until the pressure reaches some value, say, ten pounds, after which the circuit opens and remains open until the pressure has dropped to its minimum value of two pounds, the steam being supplied through a pipe 30 connected to the boiler. The switch 29 also controls the circuit to the motor 4. Thus when the pressure drops below its requisite minimum value the switch 29 closes and thus establishes a circuit for the motor driven fan 4 and for the solenoid valve 28 which then opens for the purpose of admitting steam to pipes 20 and 21 and to the pipe 39 for the purpose hereinafter described. The fan starts and draws flue gases from the flue through the steam mixing chamber 18 where the gases are mixed with steam. As the gases move through the steam mixing chamber they draw in air through the air inlet 23. The resulting mixture then passes through the damper compartment 6, through the conduit 5 to the fan and thence into the furnace.

A steam pressure device 35 is provided for moving the damper 7 to the position indicated in Figure 2 and to this end is connected through pipe 39 with the outlet side of the solenoid controlled valve 28. The steam pressure device 35 acts upon a lever 36 which is pivoted at 37, and swings the same counter-clockwise to draw a chain 38 downwardly, thus swinging the handle 12 in a clockwise direction to move the damper 7 to the position indicated in Figure 2. A counter-weight at the right hand end of the lever 36 serves to swing the lever in the opposite direction. When there is no steam pressure on the device 35 the counter-weight maintains the left hand side of the lever 36 raised, thus permitting the weight 14 to swing the damper 7 against a stop 40. When the fan motor 4 is started, as by manual operation, in the morning when there is substantially no steam pressure, the fan draws in air from the atmosphere by way of the ported disc 8. At this time the damper 7 is in a position against the stop 40 and therefore there is no recirculation of flue gases. The steam operated device 35 requires a pressure of almost two pounds of steam before it can operate the lever 36 against its counter-weight. At this time the switch 29 maintains the valve 28 open so that as the steam pressure is being built up a gradually increasing pressure is being applied to the steam device 35 and more and more steam is admitted to pipes 20 and 21. When the steam pressure reaches a value of approximately two pounds the device 35 operates and causes the damper 7 to swing to the position illustrated in Figure 2. The fan now draws in flue gases, which are being mixed with steam. When the pressure reaches the maximum value for which the switch 29 has been set the switch opens the circuit for the electromagnetically controlled valve 28 thereby shutting off the steam to the pipes 20 and 21. At the same time steam is shut off from the device 35 so that the counter-weight on the lever 36 now swings this lever counter-clockwise to permit the weight 14 to move the damper 7 against the stop 40. The opening of the switch 29 also opens the circuit to the motor operated fan or blower 4. It is therefore seen that when the motor is not operating, the damper 7 is closed against the stop 40 and thus prevents a back feed of flue gases which might otherwise escape into the basement. When the steam pressure in the boiler drops to such a value that the switch 29 again closes its circuit, thus again opening the valve 28, the steam device 35 is again operated to shift the damper 7 to the position illustrated in Figure 2.

A major portion of the smoke and flue gases is drawn from the stack 2 through the steam atomizing chamber and mixed with a small amount of air and a small amount of steam. There appears to result a physical change in the condition of the smoke particles by reason of the admixture of steam or vapor therefrom and the air by intimate commingling thereof with one another and with the smoke particles, so that upon repassage through the furnace, those combustible particles of the smoke which are contained therein are consumed and substantially no smoke is emitted from the stack; also the heat from the steam and from the exhaust products serves to pre-heat the air drawn in to effect combustion. I have found that if the steam supply to the pipes 20 and 21 is cut off the efficiency of combustion is substantially reduced. I have also found that if the steam is introduced into the steam mixing chamber in a form other than fine jets the efficiency of combustion is also reduced. It is for this reason that the pipes 20 and 21 are provided with a large number of openings through which the steam is emitted.

In compliance with the requirements of the patent statutes I have here shown and described a preferred embodiment of my invention. It is, however, to be understood that the invention is not limited to the precise construction here shown, the same being merely illustrative of the principles of the invention.

What I consider new and desire to secure by Letters Patent is:

1. In combination with a furnace having a draft intake and a flue gas outlet, duct means outside the furnace connecting the flue gas outlet with the said draft intake, fan means in said duct means for drawing flue gases from the outlet and delivering the gases to the said intake, means controlled by the furnace for controlling the fan, said duct means including also an opening for receiving atmospheric air, which opening is located between the fan means and the flue gas outlet, a damper in said duct means for connecting the fan inlet selectively to the flue gas outlet or to the air receiving opening, means for supplying steam into said duct in advance of said fan, means for operating the damper to connect the inlet of the fan with the flue gas outlet, motor means dependent upon the supply of steam to said duct for operation of said damper operating means, and gravity operated means effective upon the non-operation of the motor means for closing the communication between the flue gas outlet and the portion of the duct means leading to the fan.

2. In combination a steam generator, a furnace therefor having a draft intake and a flue gas outlet, duct means outside of the furnace connecting the flue gas outlet with the said intake, fan means in said duct means for drawing hot flue gases from the outlet and delivering the gases to the said intake, a motor for driving the fan means, means controlled by the steam pressure for starting and stopping the motor, a damper in said duct means, means operative upon the attainment of a predetermined steam pressure for moving the damper to open communication through said duct means and while the motor is in full operation, and means for automatically moving said damper to close communication through said duct means when the motor is not in operation.

3. In combination a steam generator, a furnace therefor having a draft intake and a flue gas outlet, duct means outside of the furnace connecting the flue gas outlet with the draft intake, fan means in said duct means for drawing hot flue gases from the outlet and delivering the gases to the draft intake, a motor for driving the fan means, means controlled by the steam pressure for starting and stopping the motor, a damper in said duct means, means operative upon the attainment of a predetermined steam pressure for moving the damper to open communication through said duct means and while the motor is in full operation and means for automatically moving said damper to close communication through said duct means when the motor is not in operation, said duct means including also an opening for receiving atmospheric air, which opening is located between the draft intake of the furnace and the damper whereby the damper prevents escape of flue gases through said air receiving opening.

4. In a smoke consuming apparatus for furnaces having provision for the formation of steam, means providing a mixing chamber, a duct for connecting said chamber with the exhaust gas outlet of the furnace, a second duct for connecting said chamber with the draft intake of the furnace, means for introducing steam and fresh air into said chamber simultaneously for intimate commingling with combustible parts of fuel products received in said chamber from said outlet, blower means connected with said second duct for withdrawing the mixture from said chamber and for forcing the same to the draft intake of the furnace, valve means for controlling the flow of steam to said chamber, valve means for controlling the flow of combustion products from said gas outlet to said draft intake, means operated by a characteristic of the steam formed by the furnace for closing the first one of said valve means, means for moving the other valve means toward closed position upon closing of the said first one of said valve means, and means for opening both of said valve means upon a predetermined variation in said steam characteristic.

5. In a smoke consuming apparatus for furnaces having provision for the formation of steam, means providing a mixing chamber, a duct for connecting said chamber with the exhaust gas outlet of the furnace, a second duct for connecting said chamber with the draft intake of the furnace, means for introducing steam and fresh air into said chamber simultaneously for intimate commingling with combustible parts of fuel products received in said chamber from said outlet, blower means connected with said second duct for withdrawing the mixture from said chamber and for forcing the same to the draft intake of the furnace, valve means for controlling the flow of steam to said chamber, valve means for controlling the flow of combustion products from said gas outlet to said draft intake, means operated by a predetermined rise in pressure of the steam formed by the furnace for closing the first one of said valve means, gravity means for automatically moving the other valve means toward closed position upon closing of the said first one of said valve means, and means for opening both of said valve means upon a predetermined variation in said steam pressure.

GEORGE JOSEPTH BYRNE.